United States Patent
Kogo

(10) Patent No.: US 9,193,855 B2
(45) Date of Patent: Nov. 24, 2015

(54) FLAME-RETARDANT INSULATED ELECTRIC WIRE

(75) Inventor: Kousuke Kogo, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 190 days.

(21) Appl. No.: 13/587,518

(22) Filed: Aug. 16, 2012

(65) Prior Publication Data

US 2012/0318556 A1    Dec. 20, 2012

Related U.S. Application Data

(63) Continuation of application No. PCT/JP2011/055110, filed on Mar. 4, 2011.

(30) Foreign Application Priority Data

Mar. 5, 2010  (JP) ................................. 2010-048646

(51) Int. Cl.
*H01B 7/00* (2006.01)
*C08L 23/10* (2006.01)
*H01B 7/295* (2006.01)
*C09D 123/10* (2006.01)
*H01B 3/28* (2006.01)
*H01B 3/44* (2006.01)
(Continued)

(52) U.S. Cl.
CPC ............... *C08L 23/10* (2013.01); *C09D 123/10* (2013.01); *H01B 3/28* (2013.01); *H01B 3/441* (2013.01); *H01B 3/442* (2013.01); *H01B 7/295* (2013.01); *C08K 3/0058* (2013.01); *C08K 3/22* (2013.01); *C08K 5/13* (2013.01); *C08K 5/16* (2013.01); *C08L 21/00* (2013.01); *C08L 23/16* (2013.01); *C08L 101/00* (2013.01)

(58) Field of Classification Search
USPC .................. 174/72 R, 110 A, 110 SR, 121 A; 524/189, 300, 323
See application file for complete search history.

(56) References Cited

U.S. PATENT DOCUMENTS

2002/0111411 A1* 8/2002 Hase et al. ..................... 524/433
2003/0217864 A1* 11/2003 Ishikawa et al. ............... 174/135
(Continued)

FOREIGN PATENT DOCUMENTS

| JP | 2008-169273 A | 7/2008 |
| JP | 2008-231317 A | 10/2008 |
| JP | 2009-127040 A | 6/2009 |

OTHER PUBLICATIONS

Office Action dated Oct. 15, 2013, issued by the Japanese Patent Office in corresponding Application No. 2012-503296.
(Continued)

*Primary Examiner* — Steven T Sawyer
(74) *Attorney, Agent, or Firm* — Sughrue Mion, PLLC

(57) ABSTRACT

There is provided a flame-retardant insulated electric wire having an aluminum conductor, which is excellent in long-term thermal resistance, flame retardancy, stretchability, and abrasion resistance. The present invention relates to a flame-retardant insulated electric wire containing a conductor containing an aluminum-based material and an insulating coating layer which coats the conductor, wherein the insulating coating layer is formed of a resin composition containing 100 parts by weight of a base resin containing (A) a polypropylene-based resin and (B) an olefin-based thermoplastic elastomer and a styrene-based thermoplastic elastomer, (C) 50 to 150 parts by weight of a flame retardant, and (D) 0.35 to 6.00 parts by weight of a metal scavenger.

2 Claims, 1 Drawing Sheet

(51) Int. Cl.
  *C08K 3/00*    (2006.01)
  *C08K 3/22*    (2006.01)
  *C08L 21/00*   (2006.01)
  *C08L 23/16*   (2006.01)
  *C08L 101/00*  (2006.01)
  *C08K 5/13*    (2006.01)
  *C08K 5/16*    (2006.01)

(56) References Cited

U.S. PATENT DOCUMENTS

| | | | |
|---|---|---|---|
| 2007/0155883 A1* | 7/2007 | Sato et al. | 524/420 |
| 2008/0223602 A1* | 9/2008 | Gallucci et al. | 174/110 SR |
| 2008/0234419 A1 | 9/2008 | Kambe | |
| 2009/0124743 A1* | 5/2009 | Lee | 524/414 |
| 2009/0133926 A1 | 5/2009 | Kambe | |
| 2009/0186227 A1* | 7/2009 | Jarus et al. | 428/412 |
| 2010/0093901 A1* | 4/2010 | Kawaguchi et al. | 524/189 |

OTHER PUBLICATIONS

Search Report dated Feb. 21, 2014, issued by the European Patent Office in counterpart European Application No. 11750828.3.

International Search Report for PCT/JP2011/055110 dated May 31, 2011 [PCT/ISA/210].

Written Opinion for PCT/JP2011/055110 dated May 31, 2011 [PCT/ISA/237].

Search Report dated Oct. 24, 2014, issued by the European Patent Office in counterpart European Application No. 11750828.3.

Communication dated Aug. 8, 2014 from the State Intellectual Property Office of P.R. China in a counterpart application No. 201180012573.0.

Office Action dated Feb. 13, 2015 issued by the State Intellectual Property Office of the People's Republic of China in counterpart Chinese Patent Application No. 201180012573.0.

* cited by examiner

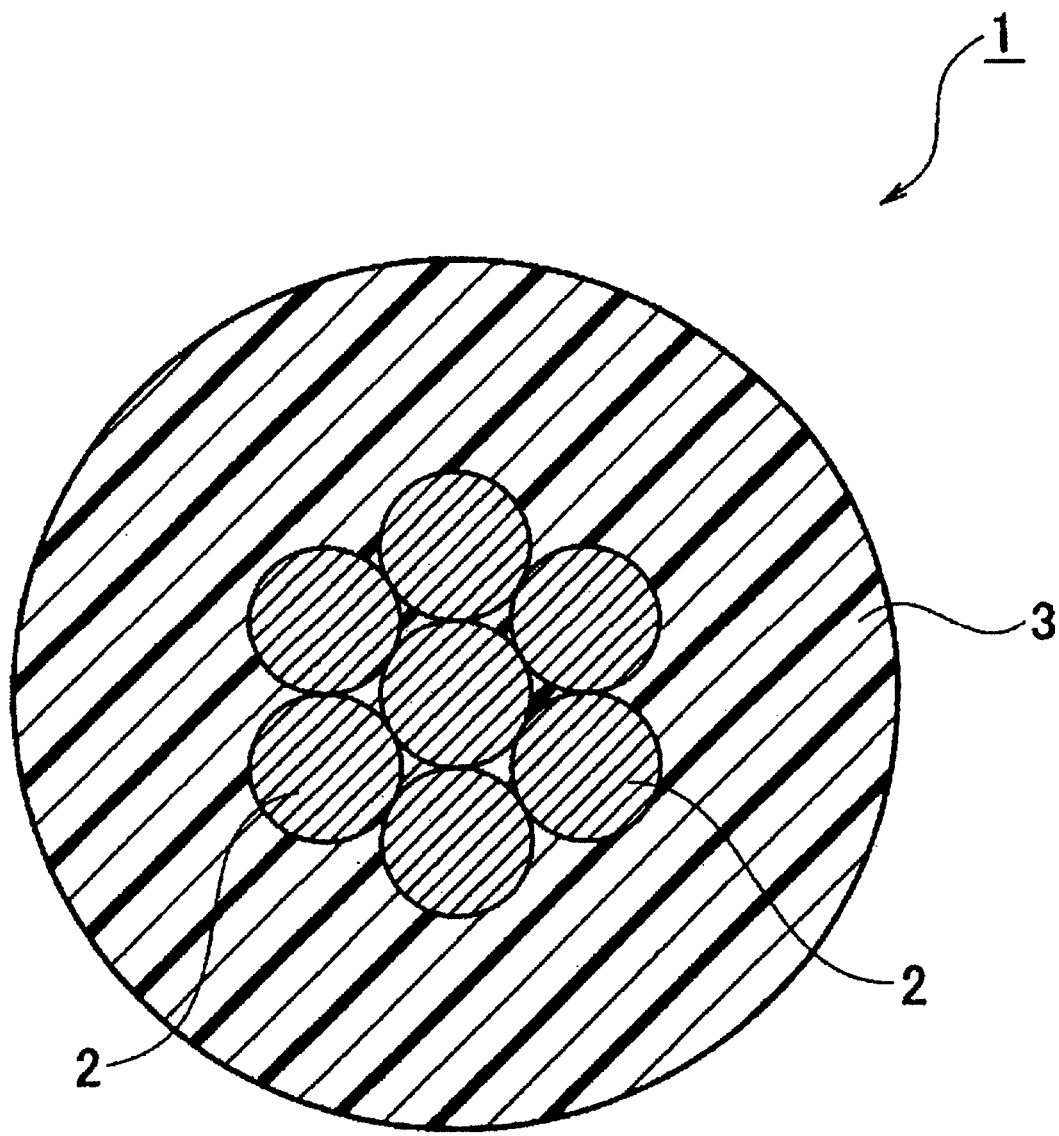

FLAME-RETARDANT INSULATED ELECTRIC WIRE

CROSS REFERENCE TO RELATED APPLICATION

This application is a continuation of PCT application No. PCT/JP2011/055110, which was filed on Mar. 4, 2011 based on Japanese Patent Application (No. 2010-048646) filed on Mar. 5, 2010, the contents of which are incorporated herein by reference. Also, all the references cited herein are incorporated as a whole.

BACKGROUND OF THE INVENTION

1. Technical Field

The present invention relates to a flame-retardant insulated electric wire obtained by coating an aluminum-based conductor with a flame-retardant resin composition.

2. Background Art

Hitherto, as flame-retardant insulated electric wires to be routed in automobiles, those obtained by coating a copper (Cu) wire with a resin composition using a polyvinyl chloride resin as a base resin have been frequently used. A polyvinyl chloride resin has excellent material properties such as flame retardancy and mechanical properties. However, there has arisen an environmental problem since harmful gases such as halogen-based gases are generated when the polyvinyl chloride resin is burned at incineration, vehicle fire, or the like.

Accordingly, in recent years, as halogen-free resin compositions, there have been developed resin compositions using a polyolefin-based resin and an olefin-based resin or a styrene-based resin as a base resin (for example, see JPA-2008-231317). In order to form a halogen-free insulating coating, the resin composition inevitably requires large amounts of additives owing to the properties of a copper wire. Namely, in the resin composition, long-term stability of mechanical strength is improved through prevention of decomposition and deterioration by adding various additives to the above base resin. As a specific example, it is necessary to include 50 to 100 parts by weight of a metal hydrate and, as additives, 3 to 5 parts by weight of a phenol-based antioxidant, 0.1 to 1.0 part by weight of a salicylic acid-based metal scavenger, 3 to 5 parts by weight of a hydrazine-based metal scavenger, and 1 to 10 parts by weight of a metal oxide into 100 parts by weight of a base material composed of a polyolefin-based resin and an olefin-based resin or a styrene-based resin. Thus, when amounts of the additives to be added increase, there is a problem that weight increases as a whole flame-retardant insulated electric wire.

In recent automobile parts, weight saving is desired and hence weight saving is required even as an electric wire for automobiles. Accordingly, it has been proposed to change a conductor from copper (Cu) into aluminum (Al).

SUMMARY OF THE INVENTION

However, in the case where an aluminum-based material is used as a conductor, it is difficult to impart flame retardancy, stretchability, abrasion resistance, long-term thermal resistance, and the like to a flame-retardant insulated electric wire. Moreover, when large amounts of additives are mixed for improving these properties, there is a problem that the mixing moves against weight saving.

Accordingly, an object of the invention is to provide a light-weight flame-retardant insulated electric wire which satisfies flame retardancy, stretchability, abrasion resistance, long-term thermal resistance, and the like using an aluminum conductor.

As a characteristic feature of the present invention, the gist thereof is a flame-retardant insulated electric wire comprising a conductor containing an aluminum-based material and an insulating coating layer which coats the conductor, wherein the insulating coating layer is formed of a resin composition containing 100 parts by weight of a base resin containing (A) a polypropylene-based resin and (B) an olefin-based thermoplastic elastomer and a styrene-based thermoplastic elastomer, (C) 50 to 150 parts by weight of a flame retardant, and (D) 0.35 to 6.00 parts by weight of a metal scavenger.

According to the present invention, there is obtained a flame-retardant insulated electric wire which is light in weight and has high flame retardancy and high mechanical properties such as stretchability, abrasion resistance, and long-term thermal resistance.

BRIEF DESCRIPTION OF THE DRAWING

FIG. 1 is a cross-sectional view showing a flame-retardant insulated electric wire according to the invention.

DETAILED DESCRIPTION OF THE EXEMPLARY EMBODIMENTS

The following will explain the flame-retardant insulated electric wire according to an embodiment of the present invention in detail.

In the description, "% by mass" and "part(s) by mass" have the same meanings as "% by weight" and "part(s) by weight", respectively.

In the invention, halogen-free or non-halogen means that any halogen compound is not contained as an effective component for exhibiting various functions such as flame retardancy in the resin composition and does not mean that halogens slightly contained unavoidably as impurities or the like are also not contained.

[Flame-Retardant Insulated Electric Wire]

FIG. 1 is a cross-sectional view showing a flame-retardant insulated electric wire 1 according to an embodiment of the invention. As shown in FIG. 1, the flame-retardant insulated electric wire 1 is constituted by coating a bundle of plural conductors 2 composed of an aluminum-based material with an insulating coating 3 composed of a flame-retardant resin composition. Since such a flame-retardant insulated electric wire 1 is coated with a flame-retardant resin composition having high flame retardancy and high mechanical properties such as stretchability, abrasion resistance, and long-term thermal resistance that is to be mentioned below, the electric wire is highly reliable even in the case where it is used as an electric wire for automobiles.

The conductor 2 contains an aluminum-based material and is preferably composed of an aluminum-based material. The conductor can be, for example, formed of aluminum, an aluminum alloy, or a composite material using aluminum as a main material.

The insulating coating 3 is formed of a resin composition wherein (C) 50 to 150 parts by weight of a flame retardant and (D) 0.35 to 6.00 parts by weight of a metal scavenger are blended into 100 parts by weight of a base resin containing (A) a polypropylene-based resin and (B) at least one of an olefin-based thermoplastic elastomer and a styrene-based thermoplastic elastomer. Here, the resins to be used are all non-crossliked resins.

(A) Polypropylene-based Resin:

(A) the polypropylene-based resin includes a propylene homopolymer, a block copolymer of a propylene homopolymer with ethylene, 1-butene, or the like, and the like. They may be used singly or two or more thereof may be used in combination. Moreover, the polypropylene-based resin is not limited thereto and may be a polypropylene-based resin other than them.

(B) Olefin-based or Styrene-based Thermoplastic Elastomer

The olefin-based thermoplastic elastomer includes a mixture of a non-crystalline polyolefin and an amorphous olefin-based copolymer rubber, as a structure, and the like. The non-crystalline polyolefin includes a propylene/ethylene random copolymer, a propylene-α-olefin random copolymer, a propylene/ethylene-α-olefin random copolymer, and the like. The amorphous olefin-based copolymer rubber includes an ethylene/propylene copolymer rubber (EPM), an ethylene/1-butene copolymer rubber (EBM), an ethylene/propylene/butene copolymer rubber, an ethylene/propylene/non-conjugated diene copolymer rubber (EPDM), and the like. In this regard, examples of the olefin-based thermoplastic elastomer include MIRASTOMER (manufactured by Mitsui Chemicals Inc.), Sumitomo TPE (manufactured by Sumitomo Chemical Co., Ltd.), THERMORUN (manufactured by Mitsubishi Chemical Corporation), and the like.

The styrene-based theimoplastic elastomer includes block copolymers or random copolymers having an aromatic vinyl-based polymer block (hard segment) and a conjugated diene-based polymer block (soft segment). Monomer for the aromatic vinyl-based polymer includes styrene, α-alkyl-substituted styrenes such as α-methylstyrene, α-ethylstyrene, and α-methyl-p-methylstyrene, nuclear alkyl-substituted styrenes such as o-methylstyrene, m-methylstyrene, p-methylstyrene, 2,4-dimethylstyrene, ethylstyrene, 2,4,6-trimethylstyrene, o-t-butylstyrene, p-t-butylstyrene, and p-cyclohexylstyrene, and the like. The conjugated diene-based compound includes butadiene, isoprene, methylpentadiene, and the like. As the other rubber component, for example, a diene-based rubber such as styrene-butadiene rubber (SBR), nitrile rubber (NBR), or butyl rubber (IIR) may be used. In this regard, examples of the styrene-based thermoplastic elastomer include RABALON (manufactured by Mitsubishi Chemical Corporation), Sumitomo TPE-SB (manufactured by Sumitomo Chemical Co., Ltd.), SEPTON and HYBRAR (manufactured by Kuraray Co. Ltd.), and the like.

They may be used singly or two or more thereof may be used in combination. The mixing ratio in the case of the combined use is not particularly limited and it is preferred that olefin-based thermoplastic elastomer/styrene-based thermoplastic elastomer is 4/1 to 5/2 (weight ratio).

The aforementioned base resin containing (A) the polypropylene-based resin and (B) at least one of the olefin-based and styrene-based thermoplastic elastomers is preferably composed of 70 to 90% by weight of the polypropylene-based resin and 30 to 10% by weight of at least one of the olefin-based and styrene-based thermoplastic elastomers. Here, a sufficient abrasion resistance is obtained when the polypropylene-based resin is in an amount of 70% by weight or more and, when the amount is 90% by weight or less, there is no concern that stretchability and impact resistance decrease, so that the case is preferred.

As (C) the flame retardant, it is preferred to use a metal hydrate such as magnesium hydroxide, aluminum hydroxide, antimony trioxide, antimony pentoxide, or zinc borate. Moreover, with regard to the ratio of the flame retardant to be blended, it is added so as to be in an amount of 50 to 150 parts by weight, preferably 80 to 120 parts by weight based on 100 parts by weight of the base material. Here, a sufficient flame retardancy is not obtained when the amount of the flame retardancy to be added is less than 50% by weight. When the amount exceeds 150% by weight, the flame retardancy is hardly improved with an increase in the amount thereof and stretchability and long-term thermal resistance decrease.

As (D) the metal scavenger, it is preferred to use a salicylic acid-based or hydrazine-based metal scavenger.

Examples of the salicylic acid-based metal scavenger include N,N'-disalicylidene-ethylenediamine, N,N'-disalicylidene-1,2-propylenediamine, N,N'-disalicylidene-N'-methyl-dipropylenetriamine, 3-(N-salicyloyl)amino-1,2,4-triazole, decamethylenedicarboxylic acid-bis(N'-salicyloylhydrazide), and the like. They may be used singly or two or more thereof may be used in combination. Moreover, the salicylic acid-based metal scavenger is not limited only thereto but may be a salicylic acid-based metal scavenger other than them unless it moves against the object of the invention.

Examples of the hydrazine-based metal scavenger include 2-ethoxy-2'-ethyloxanilide, 5-t-butyl-2-ethoxy-2'-ethyloxanilide, N,N-diethyl-N',N'-diphenyloxamide, N,N'-diethyl-N,N'-diphenyloxamide, oxalic acid-bis(benzylidenehydrazide), thiodipropionic acid-bis(benzylidenehydrazide), isophthalic acid-bis(2-phenoxypropionylhydrazide), bis (salicyloylhydrazine), N-salicylidene-N'-salicyloylhydrazone, 2',3-bis{[3-(3,5-di-t-butyl-4-hydroxyphenyl)propionyl]}propionohydrazide, and the like. They may be used singly or two or more thereof may be used in combination. Moreover, the hydrazine-based metal scavenger is not limited only thereto but may be a hydrazine-based metal scavenger other than them unless it moves against the object of the invention.

These metal scavengers may be used singly or a plurality of them may be used in combination. It is added so as to be in an amount of 0.35 to 6.00 parts by weight, preferably 1 to 3 parts by weight based on 100 parts by weight of the base resin. Namely, when the amount is less than 0.35 part by weight, a sufficient auxiliary effect of the antioxidant to be mentioned below is not obtained by scavenging metal. Moreover, when the amount exceeds 6.00 parts by weight, bleed-out takes place.

In the present embodiment, in addition to the above constituent materials, a phenol-based antioxidant is preferably added so as to be in an amount of 1 to 3 parts by weight based on 100 parts by weight of the base resin.

Examples of the phenol-based antioxidant include 2,6-di-t-butyl-4-methylphenol, tetrakis [methylene-3(3',5'-di-t-butyl-4-hydroxyphenyl)propionate]methane, octadecyl-3-(3,5-di-tert-butyl-4-hydroxyphenyl)propionate, 3,9-bis{2-[3-(3-t-butyl-4-hydroxy-5-methylphenyl)propionyloxy]-1,1-dimethylethyl}-2,4,8,10-tetraoxaspiro[5.5]undecane, 1,3,5-tris2[3(3,5-di-t-butyl-4-hydroxyphenyl)propionyloxy]ethyl isocyanate, 1,3,5-trimethyl-2,4,6-tris(3,5-di-t-butyl-4-hydroxybenzyl)benzene, tris(3,5-di-t-butyl-4-hydroxybenzyl) isocyanurate, 1,3,5-tris(4-t-butyl-3-hydroxy-2,6-dimethylbenzyl)isocyanurate, pentaerythritol tetrakis[3-(3,5-di-t-butyl-4-hydroxyphenyl)propionate], triethylene glycol-N-bis-3-(3-t-butyl-5-methyl-4-hydroxylphenyl)propionate, 1,6-hexanediol bis[3-(3,5-di-t-butyl-4-hydroxyphenyl)propionate], 2,2-thiobis-diethylenebis[3-(3,5-di-t-butyl-4-hydroxyphenyl)propionate], 2,2'-methylenebis-(4-methyl-6-t-butylphenol), 2,2'-methylenebis-(4-ethyl-6-t-butylphenol), 2,2'-methylenebis-(4,6-di-t-butylphenol), 2,2'-ethylenebis-(4,6-di-t-butylphenol) (Cheminox 1129), 2,2'-butylenebis-(4-methyl-6-t-butylphenol), 4,4'-butylidenebis-(3-methyl-6-t-butylphenol), 2-t-butyl-6-(3-t-butyl-2-hydroxyl-5- methylbenzyl)-4-methylphenyl acrylate, 2,4-di-t-amyl-6-[1-(3,5-di-t-amyl-2-hydroxylphenyl)ethyl]phenyl acrylate, tocopherols, and the like. Tocopherols specifically include α-tocopherol (5,7,8-trimethyltocol), β-tocopherol (5,8-dimethyltocol), γ-tocopherol (7,8-dimethyltocol), σ-tocopherol (8-methyltocol), and the like. They may be used singly or two or more thereof may be used in combination. Moreover, the phenol-based antioxidant is not limited only thereto but may be a phenol-based antioxidant other than them unless it moves against the object of the invention.

The phenol-based antioxidant is preferably added so that the amount is 1 to 3 parts by weight based on 100 parts by weight of the base resin. When the amount is 1 part by weight or more, deterioration by oxidation can be sufficiently prevented and also, when the amount is 3 parts by weight or less, an effect of preventing oxidation is improved as the amount increases, so that the case is preferred.

Furthermore, in the embodiment, each component constituting the above resin composition does not contain any halogen and thus any halogen-based gas is not generated at combustion. Moreover, in the embodiment, a colorant, a lubricant, an antistatic agent, a foaming agent, and the like may be added to the above constitution of the resin composition, within ranges where the advantages of the invention are not impaired.

Moreover, in the embodiment, as shown in FIG. 1, the electric wire has a constitution that a plurality of conductors 2 are coated with the insulated coating 3 but, as a matter of course, it may have a constitution that one conductor 2 is coated with the insulated coating 3. Needless to say, the invention can be applied to various electric wires and wire harnesses.

In the flame-retardant insulated electric wire 1 according to the embodiment having the above constitution, a remarkable weight saving is achieved by using the conductor 2 of an aluminum-based material and also the long-term thermal resistance can be realized even when small amounts of additives to be blended are used as compared with the amount thereof in the case where a conventional copper conductor is used. In addition, the flame-retardant insulated electric wire 1 having the above constitution also possesses flame retardancy and mechanical properties such as stretchability and abrasion resistance.

EXAMPLES

The following will specifically explain Examples of the invention and Comparative Examples.
(Blending Resins and Materials used in Examples and Comparative Examples)
(A) Polypropylene-based Resin
  PS210A (manufactured by SunAllomer Ltd.)
(B) Olefin-based/Styrene-based Thermoplastic Elastomer
  MIRASTOMER (manufactured by Mitsui Chemicals Inc.) as an olefin-based thermoplastic elastomer and RABALON (manufactured by Mitsubishi Chemical Corporation) as a styrene-based thermoplastic elastomer were used in combination. The mixing ratio of the olefin-based thermoplastic elastomer to the styrene-based thermoplastic elastomer was 4/1 (weight ratio).
(C) Flame Retardant
  Magnesium hydroxide
(D) Metal Scavenger
  A salicylic acid-based metal scavenger Insulated electric wires were prepared by coating an aluminum conductor with each of resin compositions obtained by blending the above materials. In the test of long-term thermal resistance, an insulated electric wire obtained by coating the conductor with a PCV resin composition is also used.
(Concerning Judgment Criteria)
*Long-term Thermal Resistance:
  A polyvinyl chloride-based pressure-sensitive adhesive tape was wound around the outer periphery of an electric wire bundle where the insulated electric wires of the invention and the insulated electric wires obtained by coating a conductor with a PCV resin composition had been mixed in arbitrary numbers. After the resulting bundle was allowed to stand at 150° C. for 100 hours to undergo thermal aging, one wire of the insulated electric wires according to the invention was taken out. When it was subjected to self-wrapping, the sample which exhibited no crack on the halogen-free resin composition was evaluated as qualified (○) and the sample which exhibited crack(s) was evaluated as disqualified (×).
*Flame Retardancy test:
  It was conducted in accordance with ISO 6722 (2006). A sample obtained by cutting out an insulated electric wire, which had been formed by extrusion of a flame-retardant resin composition, in a length of 600 mm was fixed in a calm tank at an incline of an angle of 45°. After reducing flame of a Bunsen burner was applied to a portion about 200 mm±5 mm apart from the upper end for 15 seconds and the flame was gently removed, a time required for putting the flame out was measured. A target value thereof is 70 seconds or less. Therefore, the case where the flame was put out within 70 seconds that was a target value was evaluated as qualified (○) and the case where the flame was put out for a time exceeding 70 seconds was evaluated as disqualified (×).
*Stretchability Test:
  It was conducted in accordance with JIS C 3005 (2000). An insulated electric wire was cut out in a length of 150 mm and was transformed into a tubular test piece of a coating layer alone by removing the conductor. Thereafter, marked lines were put at the central portion at an interval of 50 mm. Then, after both ends of the test piece were fixed to chucks of a tensile tester at room temperature, it was drawn at a drawing rate of 25 to 500 mm/minute and a distance between the marked lines was measured. When elongation was 500% or more, it was evaluated to be qualified (○) and, when elongation was less than 500%, it was evaluated to be disqualified (×).
*Abrasion Resistance Test:
  It was conducted in accordance with ISO 6722 (2006). It was conducted using a scrape abrasion testing apparatus. Namely, an insulated electric wire having a length of about 1 m was placed on a sample holder and was fixed with a clamp. Then, a plunge possessing a piano wire having a diameter of 0.45 mm at the tip was applied to the insulated electric wire under a total load of 7N using a pressurizing member and was reciprocated (reciprocation distance: 14 mm). The number of reciprocation times until the piano wire of the plunge touched the conductor of the insulated electric wire due to abrasion of the coating layer of the insulated electric wire was counted. When the number of times was 300 or more, it was evaluated to be qualified (○) and, when the number was less than 300, it was evaluated to be disqualified (×).

The following will explain specific Examples of the invention and also compare Examples and Comparative Examples. In Examples 1 to 16 and Comparative Examples 1 to 8, after materials were blended in blend ratios shown in Tables 1 and 2, they were melt-kneaded at a temperature of 200° C. and extruded in an extrusion machine. Thereby, an aluminum conductor was coated with insulating coating to manufacture insulated electric wires. In Tables 1 and 2, test results of long-term thermal resistance, flame retardancy, stretchability, and abrasion resistance are described.

Examples 1 to 16

Into 100 parts by weight of a base resin formed of (A) 70 to 90 parts by weight of the polypropylene-based resin and (B) 30 to 10 parts by weight of the olefin-based thermoplastic elastomer and the styrene-based thermoplastic elastomer, (C) 50 to 150 parts by weight of the flame retardant and (D) 0.35 to 6.00 parts by weight of the metal scavenger were blended.

Comparative Examples 1 to 8

Into 100 parts by weight of a base resin formed of (A) 70 to 90 parts by weight of the polypropylene-based resin and (B) 30 to 10 parts by weight of the olefin-based thermoplastic elastomer and the styrene-based thermoplastic elastomer, (C) 45 to 155 parts by weight of the flame retardant and (D) 0.3 to 1 part by weight of the metal scavenger were blended.

TABLE 1

| | Example | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| A | 90 | 80 | 70 | 90 | 70 | 90 | 70 | 90 | 70 | 90 | 70 | 90 | 80 | 70 | 90 | 70 |
| B | 10 | 20 | 30 | 10 | 30 | 10 | 30 | 10 | 30 | 10 | 30 | 10 | 20 | 30 | 10 | 30 |
| C | 50 | 50 | 50 | 50 | 50 | 50 | 50 | 50 | 50 | 120 | 120 | 150 | 150 | 150 | 150 | 150 |
| D | 0.35 | 0.35 | 0.35 | 0.5 | 0.5 | 1 | 1 | 6 | 6 | 0.35 | 0.35 | 0.35 | 0.35 | 0.35 | 6 | 6 |
| Long-term thermal resistance | ○ | ○ | ○ | ○ | ○ | ○ | ○ | ○ | ○ | ○ | ○ | ○ | ○ | ○ | ○ | ○ |
| Flame retardancy | ○ | ○ | ○ | ○ | ○ | ○ | ○ | ○ | ○ | ○ | ○ | ○ | ○ | ○ | ○ | ○ |
| Stretchability | ○ | ○ | ○ | ○ | ○ | ○ | ○ | ○ | ○ | ○ | ○ | ○ | ○ | ○ | ○ | ○ |
| Abrasion resistance | ○ | ○ | ○ | ○ | ○ | ○ | ○ | ○ | ○ | ○ | ○ | ○ | ○ | ○ | ○ | ○ |

TABLE 2

| | Comparative Example | | | | | | | |
|---|---|---|---|---|---|---|---|---|
| | 1 | 2 | 3 | 4 | 5 | 6 | 7 | 8 |
| A | 90 | 70 | 90 | 70 | 90 | 70 | 90 | 70 |
| B | 10 | 30 | 10 | 30 | 10 | 30 | 10 | 30 |
| C | 50 | 50 | 45 | 45 | 155 | 155 | 155 | 155 |
| D | 0.3 | 0.3 | 0.35 | 0.35 | 0.35 | 0.35 | 1 | 1 |
| Long-term thermal resistance | X | X | ○ | ○ | X | X | ○ | ○ |
| Flame retardancy | ○ | ○ | X | X | ○ | ○ | ○ | ○ |
| Stretchability | ○ | ○ | ○ | ○ | X | X | X | X |
| Abrasion resistance | ○ | ○ | ○ | ○ | X | X | X | X |

From the results shown in Tables 1 and 2, it is found that the flame retardant is preferably in an amount ranging from 50 to 150 parts by weight based on 100 parts by weight of the base resin. Namely, when Examples 4 and 5 were compared with Comparative Examples 3 and 4, good results were obtained in the test results of all of the long-term thermal resistance, flame retardancy, stretchability, and abrasion resistance in Examples 4 and 5 where (C) the flame retardant was in an amount of 50 parts by weight. However, in Comparative Examples 3 and 4, the flame retardancy was evaluated to be disqualified (×) only by changing the amount of (C) the flame retardant into 45 parts by weight in the blends of Examples 4 and 5. From such results, it is found that (C) the flame retardant is preferably in an amount of 50 parts by weight or more.

Moreover, when Examples 12 and 14 were compared with Comparative Examples 5 and 6, good results were obtained in the test results of all of the long-term thermal resistance, flame retardancy, stretchability, and abrasion resistance in Examples 12 and 14 where (C) the flame retardant was in an amount of 150 parts by weight. However, in Comparative Examples 5 and 6, the long-term thermal resistance, stretchability, and abrasion resistance were evaluated to be disqualified (×). From such results, it is found that (C) the flame retardant is preferably in an amount of 150 parts by weight or less.

Furthermore, in Examples 8, 9, 15, and 16, it was found that the long-term thermal resistance, flame retardancy, stretchability, and abrasion resistance were satisfied even when (D) the metal scavenger was in an amount of 6.00 parts by weight. However, when the amount of the metal scavenger exceeds 6.00 parts by weight, bleed-out takes place, so that the amount is preferably in the range of 0.35 to 6.00 parts by weight.

As above, in the case where a conductor composed of an aluminum-based material is used, a light-weight electric wire which satisfies all of long-term thermal resistance, flame retardancy, stretchability, and abrasion resistance can be formed by blending (C) 50 to 150 parts by weight of a flame retardant and (D) 0.35 to 6.00 parts by weight of a metal scavenger into 100 parts by weight of a base resin formed of (A) 70 to 90 parts by weight of a polypropylene-based resin and (B) 30 to 10 parts by weight of an olefin-based thermoplastic elastomer and a styrene-based thermoplastic elastomer, as a blending ratio of materials constituting an insulating coating layer. Therefore, a light-weight insulated electric wire which sufficiently possesses properties as an insulated electric wire for automobiles can be realized.

While the invention has been described in detail and with reference to specific embodiments thereof, it will be apparent to one skilled in the art that various changes and modifications can be made therein without departing from the spirit and scope thereof.

What is claimed is:

1. A flame-retardant insulated electric wire comprising a conductor containing an aluminum-based material and an insulating coating layer which coats the conductor, wherein the insulating coating layer is formed of a resin composition containing 100 parts by weight of a base resin containing (A) a polypropylene-based resin and (B) an olefin-based thermoplastic elastomer and a styrene-based thermoplastic elastomer, (C) 80 to 120 parts by weight of a flame retardant, and (D) 0.35 to 3.00 parts by weight of all metal scavenger in the resin composition.

2. The flame-retardant insulated electric wire of claim 1, wherein the insulating coating layer further contains (E) 1 to less than 3 parts by weight of a phenol-based antioxidant.

* * * * *